United States Patent [19]

Miyaoh

[11] Patent Number: 5,368,316
[45] Date of Patent: Nov. 29, 1994

[54] METAL LAMINATE GASKET WITH A PLATE CONNECTING DEVICE

[75] Inventor: Yoshio Miyaoh, Tokyo, Japan

[73] Assignee: Ishikawa Gasket Co., Ltd., Tokyo, Japan

[21] Appl. No.: 80,010

[22] Filed: Jun. 23, 1993

[30] Foreign Application Priority Data

Jun. 26, 1992 [JP] Japan .............. 4-050943[U]

[51] Int. Cl.⁵ ............................................. F16J 15/08
[52] U.S. Cl. ................................... 277/235 B; 277/9
[58] Field of Search ............... 277/9, 180, 231, 232, 277/233, 234, 236, 235 B; 411/500, 501, 179

[56] References Cited

U.S. PATENT DOCUMENTS

| | | | |
|---|---|---|---|
| 2,034,610 | 3/1936 | Dicksen | 277/235 B |
| 2,157,102 | 5/1939 | Victor et al. | 277/232 |
| 2,432,949 | 12/1947 | Thorngren | 411/501 |
| 3,082,512 | 3/1962 | Scheldorf | 411/501 |
| 4,088,053 | 5/1978 | Tyree | 411/501 |

FOREIGN PATENT DOCUMENTS

| | | |
|---|---|---|
| 0338537 | 10/1989 | European Pat. Off. . |
| 2426506 | 12/1979 | France . |
| 939081 | 2/1956 | Germany . |
| 3610541 | 10/1987 | Germany . |
| 3936967 | 8/1990 | Germany . |
| 63-119935 | 5/1988 | Japan . |
| 4-28272 | 3/1992 | Japan . |
| 2103308A | 2/1983 | United Kingdom . |

*Primary Examiner*—William A. Cuchlinski, Jr.
*Assistant Examiner*—Daniel G. Delumpo
*Attorney, Agent, or Firm*—Kanesaka & Takeuchi

[57] ABSTRACT

A metal laminate gasket of the invention is used for an internal combustion engine. The gasket is basically formed of first and second metal plates piled together, and includes a cylindrical portion integrally formed on the first metal plate with a first hole, and a second hole formed in the second plate. The cylindrical portion extends substantially perpendicularly to the first plate, and has an axial length along the inner periphery at least equal to the thickness of the gasket. The second hole has a diameter greater than an outer diameter of the cylindrical portion. When the gasket is assembled, after the cylindrical portion is inserted into the second hole, the cylindrical portion is enlarged to press fit against the inner periphery of the second hole. Thus, the first and second metal plates are firmly connected together without portions extending outwardly from outer surfaces of the gasket.

4 Claims, 1 Drawing Sheet

METAL LAMINATE GASKET WITH A PLATE CONNECTING DEVICE

BACKGROUND OF THE INVENTION AND RELATED ART STATEMENT

The present invention relates to a metal laminate gasket with a plate connecting device, which connects metal plates for constituting the metal laminate gasket.

A metal laminate gasket is formed of a plurality metal plates laminated together. Thus, after the metal plates are laminated, the laminated plates are connected to prevent disassembly of the gasket.

In case a gasket includes a grommet or a turned portion, the gasket may be connected together by the grommet or the turned portion without using a connecting device. However, if the gasket does not have the grommet or the turned portion, the metal plates are connected together by the connecting device.

In one connecting device, a lower plate may be provided with flaps, which are turned over an upper plate to connect the upper and lower plates together. In this case, at least four flaps are required to properly connect the plates together. Also, if one or more middle plates are installed between the upper and lower plates, the middle plate may not be securely retained between the upper and lower plates.

In order to solve the above problems, the plates may be connected together by spot welding. Alternatively, laminated plates may be integrally dented, wherein the bottom portions of the dent are enlarged to firmly connect the plates together [Japanese Utility Model Publication (KOKAI) 4-28272].

However, in case an outer plate is covered with a coating, or a gasket includes metal plates which are not suitable for pressing or welding, forming of dents or welding is not appropriate for connecting the plates together.

Further, in case the welding or dents are used for connecting the plates, it is required to establish portions for the welding or dents in the gasket so that the sealing ability of the gasket is not affected by the welding or dents. In this case, also, some restrictions may be imposed in forming the holes for the cylinder bores, water, oil and so on. As a result, assembly or processing cost of the gasket may rise.

The present invention has been made to obviate the above problems in the conventional techniques.

One object of the invention is to provide a metal laminate gasket, wherein metal plates can be easily and securely connected together without using specific spaces for connecting the plates.

Another object of the invention is to provide a metal laminate gasket as stated above, which can provide surface pressure around a connecting portion.

A further object of the invention is to provide a metal laminate gasket as stated above, wherein the plates are securely connected together even if the gasket includes a coating or a plate unsuitable for pressing.

A still further object of the invention is to provide a metal laminate gasket as stated above, which can be easily and economically manufactured.

Further objects and advantages of the invention will be apparent from the following description of the invention.

SUMMARY OF THE INVENTION

In the present invention, a metal laminate gasket is primarily used for an internal combustion engine. The gasket may be a cylinder head gasket or a manifold gasket.

The gasket is basically formed of first and second metal plates extending substantially throughout an entire area of the engine and piled together for constituting the metal laminate gasket. The gasket includes a cylindrical portion integrally formed on the first plate to constitute a first hole therein, and a second hole formed in the second plate.

The cylindrical portion extends substantially perpendicularly to the first plate. The cylindrical portion includes an inner periphery and an axial length along the inner periphery, which is substantially equal to the thickness of the gasket. The second hole has a diameter greater than an outer diameter of the cylindrical portion.

When the gasket is formed, the first and second plates are laminated such that the cylindrical portion is inserted into the second hole. Then, the cylindrical portion is at least partly enlarged to press fit against the inner periphery of the second hole. Thus, the first and second metal plates are firmly connected together without portions extending outwardly from outer surfaces of the gasket.

In case the gasket is a cylinder head gasket, the gasket includes cylinder bores, water holes, oil holes and bolt holes. The first hole may be used as one of the water holes, oil holes and bolt holes. Thus, the first hole is fully utilized as a part necessary to the gasket, which means that it is unnecessary to establish a specific space for a gasket connecting device.

In the invention, the cylindrical portion extends perpendicularly to the first plate, and has the axial length equal to or slightly greater than the thickness of the gasket. Thus, when the gasket is tightened, the cylindrical portion is compressed to provide surface pressure thereat, which seals around the first hole.

Also, in the invention, the first plate is only processed, and is required to have elastic property. Thus, the second plate may be made of a material which is not suitable for pressing.

The cylindrical portion may include a thickened portion formed at a forward end and projecting inwardly of the cylindrical portion. The thickened portion is a part of a flange formed at the forward end and is formed by pushing the flange inwardly of the cylindrical portion at a time of enlarging the diameter of the cylindrical portion.

Also, in the invention, one or more third plates may be situated between the first and second plates. In this case, the cylindrical portion may immovably engage the second plate by press fitting without substantially press fitting the third plate.

DETAILED DESCRIPTION OF PREFERRED EMBODIMENTS

Figure 1:
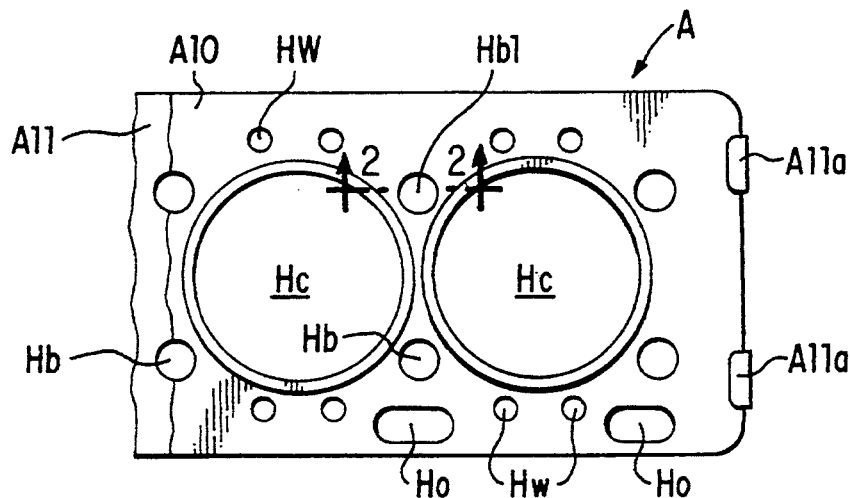
FIG. 1 is a plan view of a first embodiment of a cylinder head gasket of the invention.
Figure 2:
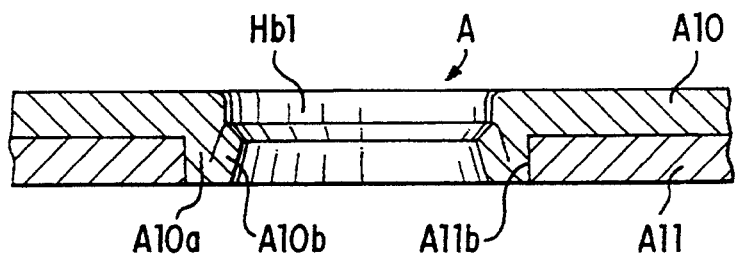
FIG. 2 is an enlarged section view taken along a line 2—2 in FIG. 1.

Referring to FIGS. 1 and 2, a first embodiment A of a metal laminate gasket of the invention is shown. The gasket A is a cylinder head gasket and includes a plurality of cylinder bores Hc, water holes Hw, oil holes Ho and bolt holes Hb, as in the conventional gasket.

The gasket A is formed of an upper plate A10, and a lower plate A11, which extend substantially throughout an entire area of an engine to be sealed. The lower plate A11 includes flaps A11a at a peripheral edge turned over the upper plate A10 to connect the upper and lower plate A10, A11 together at the longitudinal ends of the gasket A.

In the present invention, the upper and lower plates A10, A11 are also connected together at the bolt hole Hb1 by a connecting mechanism of the invention. Since the subject matter of the invention resides in the connecting mechanism, sealing mechanisms for the cylinder bores, water holes and the oil holes are omitted. Any sealing mechanisms may be used in the invention.

As shown in FIG. 2, the lower plate A11 includes a hole A11b, while the upper plate A10 includes a cylindrical portion A10a and a flange A10b. In the gasket A, the cylindrical portion A10a is located inside the hole A11b, and the flange A10b is urged against the inner periphery of the cylindrical portion A10a to press fit the cylindrical portion A10a to the inner periphery of the hole A11b.

Since the cylindrical portion A10a is press fitted to the hole A11b, the upper and lower plates A10, A11 are firmly connected together. The gasket A is not accidentally disassembled when installing to the engine.

Figure 3:
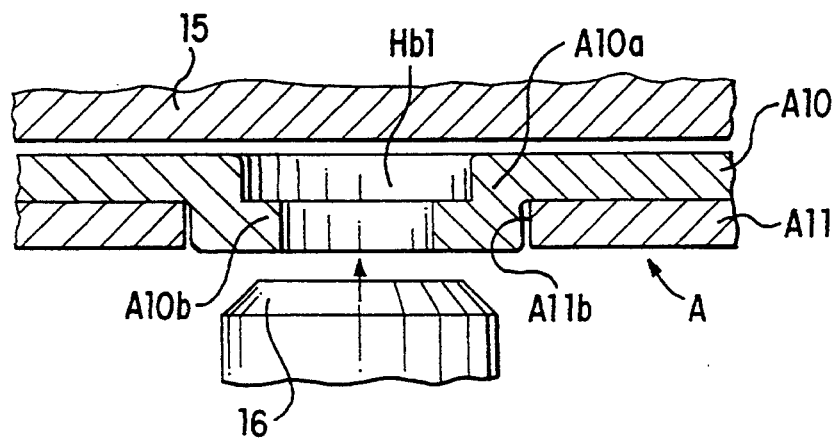
FIG. 3 is an explanatory section view for showing that the first embodiment of the invention is formed.

As shown in FIG. 3, when the gasket A is prepared, the plate A10 is formed such that the cylindrical portion A10a extends perpendicularly to the plate A10, and the flange A10b projects inwardly from the cylindrical portion A10a. The diameter of the hole A11b is made slightly larger than the outer diameter of the cylindrical portion A10a. Thus, the cylindrical portion A10a can be easily inserted into the hole A11b.

After the cylindrical portion A10a is inserted into the hole A11b of the lower plate A11, a support member 15 is placed above the upper plate A10, and a press member 16 with a tapered end is urged into the flange A10b. Thus, the flange A10b is pushed upwardly to contact the inner periphery of the cylindrical portion A10a, and the cylindrical portion A10a is slightly enlarged and press fitted to the inner periphery of the hole A11b. As a result, the plates A10, A11 are firmly joined together.

In the invention, since the flange A10b is pushed inwardly of the cylindrical portion A10a, the cylindrical portion A10a is strongly engaged with the hole A11b of the lower plate A11. Also, the strength of the cylindrical portion A10a is enhanced.

After the flange A10b is urged against the cylindrical portion A10a, a part of the flange A10b still remains inside the hole Hb1. However, the part of the flange A10b does not interfere a bolt to be inserted into the bolt hole Hb1. necessary, the flange is made small, so that when the flange is urged against the cylindrical portion A10a, a substantially flat inner surface is formed inside the cylindrical portion A10a. If required, the flange A10b may be omitted.

When the gasket A is installed in a cylinder head and a cylinder block and is tightened, the cylindrical portion A10a provides surface pressure thereat, because although the laminated portion of the two plates is slightly compressed, the cylindrical portion A10a is not substantially compressed. Thus, the cylindrical portion A10a provides sealing function, as well. Accordingly, if a sealing function is required around a water hole or an oil hole, the connecting mechanism of the invention may be employed.

Figure 4:
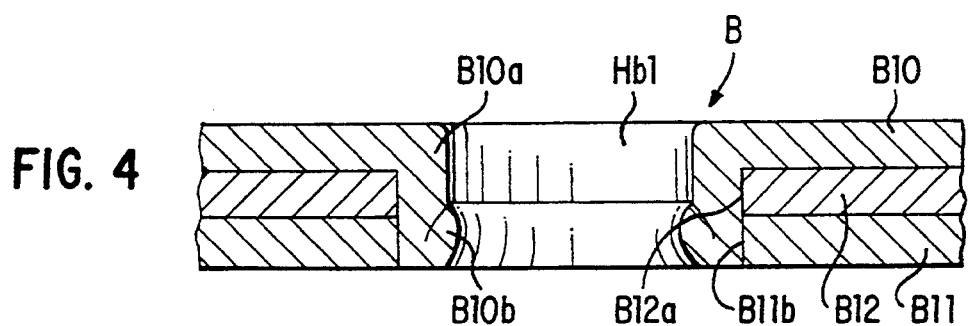
FIG. 4 is a section view, similar to FIG. 2, for showing a second embodiment of the gasket of the invention.

FIG. 4 shows a second embodiment B of the gasket of the invention. The gasket B includes an upper plate B10 having a cylindrical portion B10a and a flange B10b, and a lower plate B11 having a hole B11b, similar to the gasket A. In the gasket B, however, a middle plate B12 having a hole B12a is situated between the upper and lower plates B10, B11.

In the gasket B, the middle plate B12 is sandwiched between the upper and lower plates B10, B11. Thus, when the cylindrical portion B10a is press fitted, the cylindrical portion B10a need not directly contact the surface of the hole B12a and may directly contact only surface the surface of the hole B11b. The gasket B operates as in the gasket A.

In the gasket of the invention, the connecting mechanism can be formed around an existing hole, such as water hole, oil hole and bolt hole. Thus, the space of the gasket is sufficiently utilized. The specific space for the connecting mechanism is not required. If required, however, the connecting mechanism may be independently formed in addition to the existing holes.

In the present invention, if the plate with the cylindrical portion is made of a compressible material having elasticity, other plate need not have such property. Further, even if the outer plate has a coating, it is possible to easily and securely connect the plates together. The connecting mechanism of the invention may be used for various kinds of the gaskets.

While the invention has been explained with reference to the specific embodiments of the invention, the explanation is illustrative, and the invention is limited only by the appended claims.

What is claimed is:

1. A metal laminate gasket for an internal combustion engine, comprising:

first and second metal plates extending substantially throughout an entire area of the engine to be sealed, said metal plates being piled together for constituting the metal laminate gasket, a cylindrical portion integrally formed with the first metal plate and extending substantially perpendicularly to the first metal plate, said cylindrical portion having an inner periphery to form a first hole therein, a forward end located away from the first plate and an axial length along the inner periphery substantially equal to the thickness of the gasket, a second hole formed in the second metal plate, said second hole having an inner periphery and a diameter greater than an outer diameter of the cylindrical portion, and a thickened portion formed inside the cylindrical portion at an area away from the first metal plate, said thickness portion extending from the forward end of the cylindrical portion and closely located on a part of the inner periphery of the cylinder portion said cylindrical portion, after being inserted into the second hole, being enlarged to press fit against the inner periphery of the second hole by bending and pushing a flange radially inwardly extending from the forward end of the cylindrical portion to thereby form the thickened portion so that the first and second metal plates are firmly connected together without portions of said cylindrical portion extending beyond outer surfaces of the gasket.

2. A metal laminate gasket according to claim 1, further comprising at least one third plate situated between the first and second plates.

3. A metal laminate gasket according to claim 1, wherein said cylindrical portion provides surface pressure when the gasket is tightened to thereby seal around the first hole.

4. A metal laminate gasket according to claim 3, wherein said gasket includes a cylinder bore, a water hole, an oil hole and bolt holes, said first hole constituting at least one of the water hole, oil hole and bolt holes.

* * * * *

UNITED STATES PATENT AND TRADEMARK OFFICE
CERTIFICATE OF CORRECTION

PATENT NO. : 5,368,316

DATED : November 29, 1994

INVENTOR(S) : Yoshio Miyaoh

It is certified that error appears in the above-identified patent and that said Letters Patent is hereby corrected as shown below:

Column 4, line 63, add a comma after "portion" (first occurrence).

Signed and Sealed this

Seventh Day of February, 1995

Attest:

BRUCE LEHMAN

Attesting Officer     Commissioner of Patents and Trademarks